United States Patent [19]
Braslaw et al.

[11] Patent Number: 5,683,032
[45] Date of Patent: Nov. 4, 1997

[54] AIR MEASURING APPARATUS AND METHOD FOR PAINT ROTARY BELL ATOMIZERS

[75] Inventors: Jacob Braslaw, Farmington Hills; Kevin R. Ellwood, Ann Arbor; Robert M. Smith, Farmington Hills, all of Mich.

[73] Assignee: Ford Global Technologies, Inc., Dearborn, Mich.

[21] Appl. No.: 496,507

[22] Filed: Jun. 29, 1995

[51] Int. Cl.⁶ .................................................. B05B 17/04
[52] U.S. Cl. .................................. 239/7; 239/8; 239/101; 239/222.11; 239/223; 239/300; 239/461; 73/861.65
[58] Field of Search ............................ 239/101, 222.11, 239/223, 224, 703, 7, 8, 300, 461; 73/861.65

[56] References Cited

U.S. PATENT DOCUMENTS

| | | | |
|---|---|---|---|
| 1,759,239 | 5/1930 | Morrison. | |
| 2,929,248 | 3/1960 | Sprenkle | 73/198 |
| 3,733,898 | 5/1973 | Yamamoto et al. | 73/198 |
| 3,840,051 | 10/1974 | Akashi et al. | 138/37 |
| 4,280,360 | 7/1981 | Kobayashi et al. | 73/198 |
| 4,476,729 | 10/1984 | Stables et al. | 73/861.65 X |
| 4,570,493 | 2/1986 | Leemhuis | 73/861.65 X |
| 4,896,834 | 1/1990 | Coeling et al. | 239/703 X |
| 5,014,552 | 5/1991 | Kamiunten et al. | 73/204.21 |
| 5,078,321 | 1/1992 | Davis et al. | 239/703 X |
| 5,182,900 | 2/1993 | Horak et al. | 57/22 |

*Primary Examiner*—Andres Kashnikow
*Assistant Examiner*—Steven J. Ganey
*Attorney, Agent, or Firm*—Joseph W. Malleck

[57] ABSTRACT

Apparatus for measuring the velocity of shaping air in a rotary bell atomizer for a paint sprayer, including a funnel that collects substantially all of the shaping air, a means for straightening the collected shaping air and a means for measuring the velocity of the straightened shaping air. These techniques enable the average velocity of the shaping air to be calibrated from a single velocity sample.

14 Claims, 6 Drawing Sheets

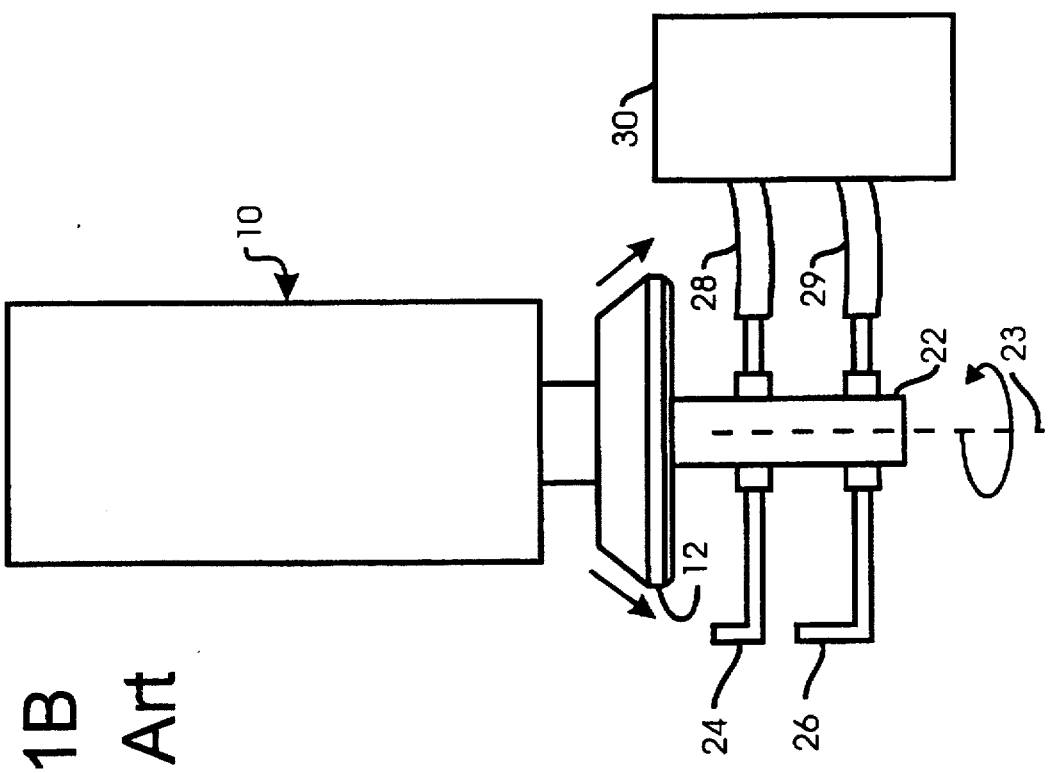
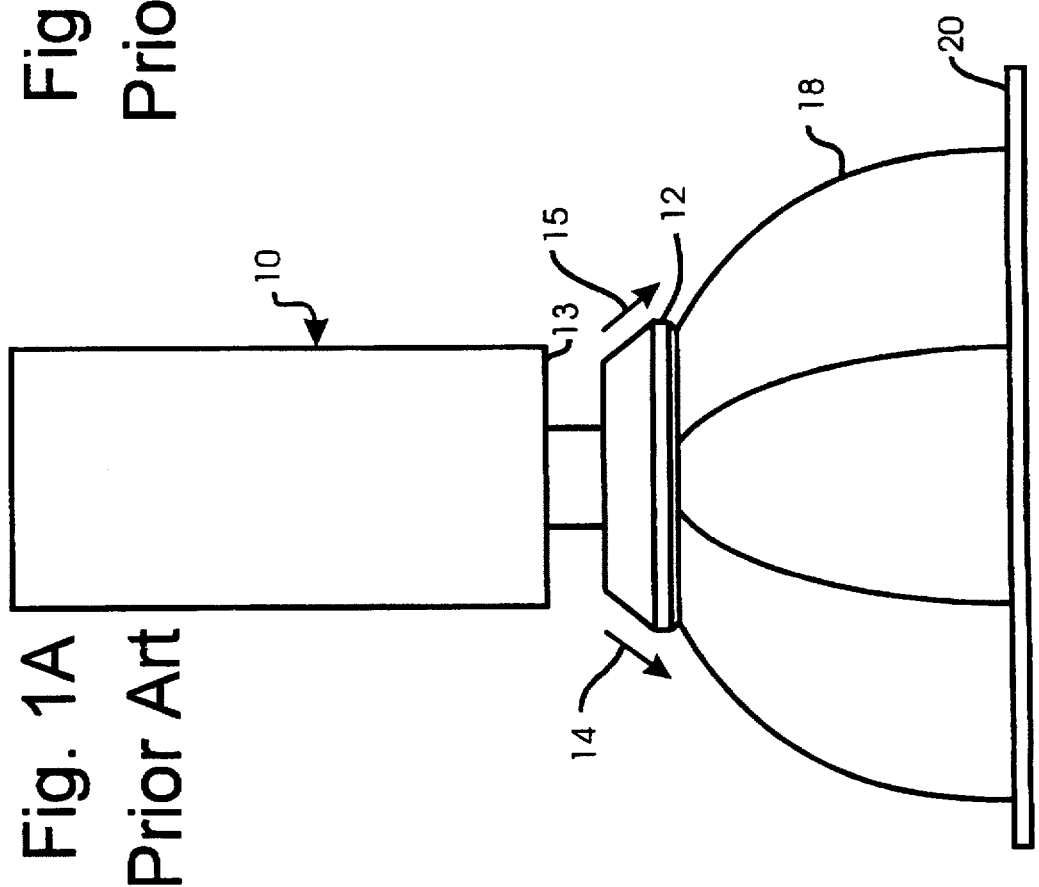

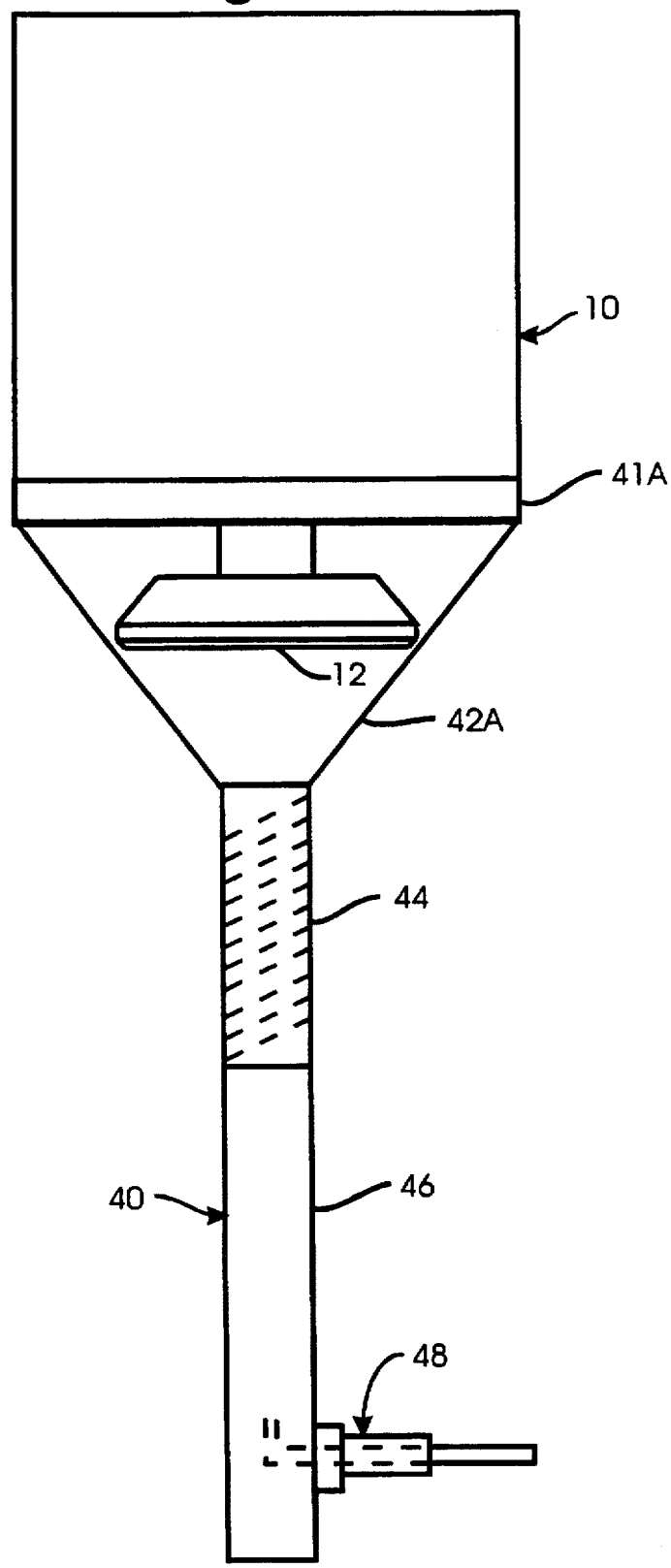

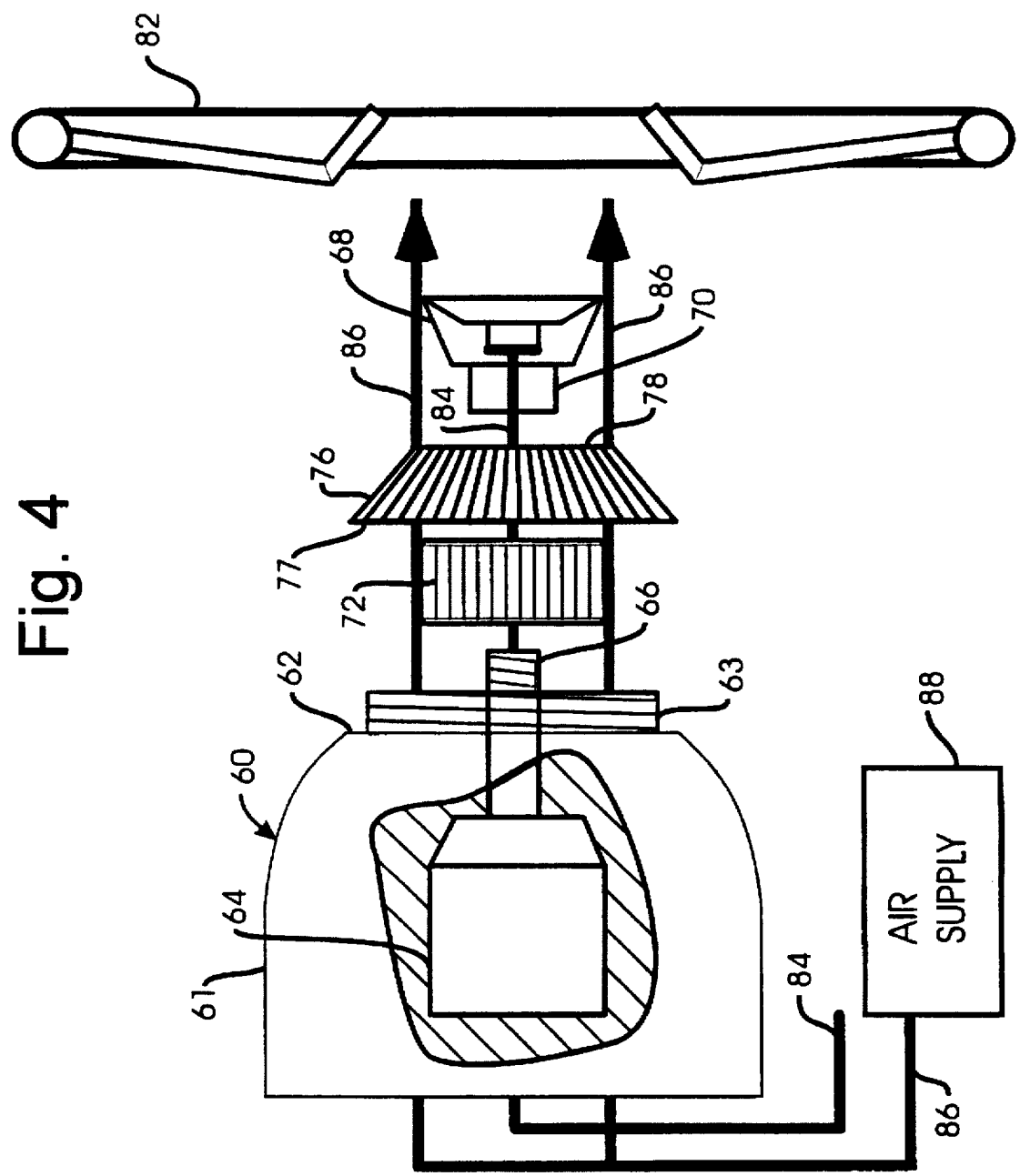

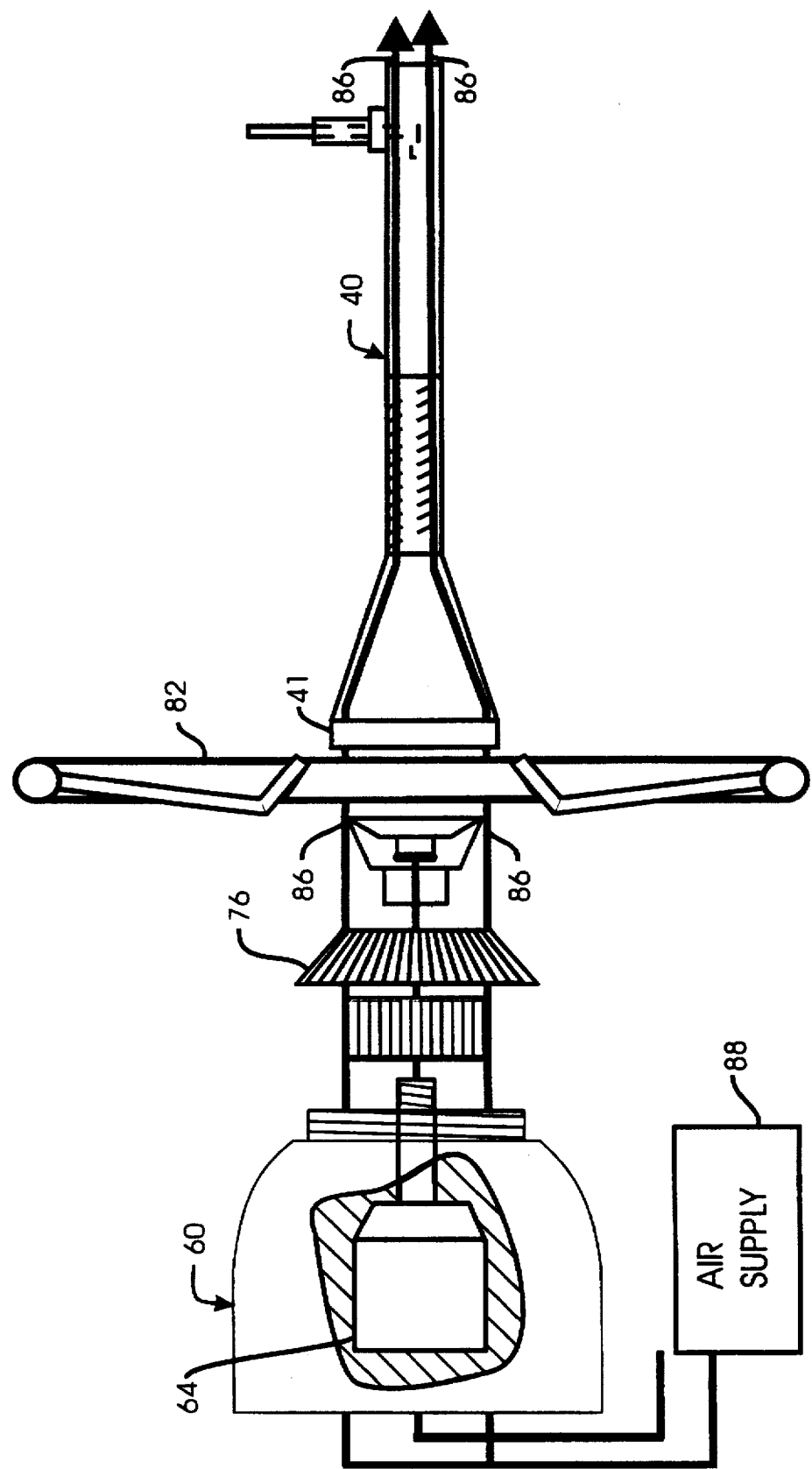

5,683,032

AIR MEASURING APPARATUS AND METHOD FOR PAINT ROTARY BELL ATOMIZERS

FIELD OF THE INVENTION

This invention is directed to paint spraying, and is more particularly directed to apparatus and method for measuring the velocity of shaping air in rotary bell paint atomizers.

BACKGROUND OF THE INVENTION

Prior apparatus for measuring the velocity of shaping air of a rotary bell paint atomizer is illustrated in FIGS. 1A and 1B. A rotary bell atomizer for a spray painter 10 is fitted with a bell cup 12. Defining shaping air emerges from a shaping air distributor 13 in a generally conical pattern as indicated by arrows 14 and 15. The atomized paint and shaping air define a paint spray pattern 18 that sprays paint droplets on a surface 20 to be painted.

Shaping air velocity is one of the main variables affecting the paint pattern produced by painter 10. The shaping air velocity is generally controlled by adjusting the pressure at which it is supplied to the atomizer. However, the method of balancing the pressure at which shaping air is supplied to the bell cup rarely works well in a production environment. Pressure drops in the air supply lines and the atomizer are generally different from one bell to the other, and the pressure changes from time to time.

In an attempt to control shaping air velocity, efforts have been made in the past to determine shaping air velocity by mounting an air velocity sensor on a modified version of bell cup 12. Referring to FIG. 1B, the modified bell cup is fitted with a cylinder 22 that rotates around a vertical axis 23. Cylinder 22 is fitted with a measuring Pitot tube 24 and a reference static pressure tube 26 in the positions shown. Tubes 24 and 26 are connected by hoses 28 and 29 to a micromanometer 30.

Cylinder 22, as well as tubes 24 and 26, are rotated around axis 23 in order to provide a series of measurements of air velocity around the generally conical pattern of shaping air produced by painter 10. Based on the measurements taken at various points in the circle traversed by tubes 24 and 26, the average shaping air velocity as a function of shaping air supply pressure can be determined.

The technique illustrated in FIG. 1B requires that the shaping air velocity be calibrated when the turbine driving rotating cup 12 is disabled. Thus, the technique is limited to bells in which the air turbine exhaust is independent of the shaping air system. In addition, the technique relies on multiple readings and averaging of results, because measuring tube 24 cannot be maneuvered to capture essentially all of the shaping air produced by painter 10.

Various forms of fluid flow measuring devices have been devised in the past, including types in which fluid flow straightening apparatus is included. Examples of these devices are shown in one or more of the following U.S. patents:

| U.S. Pat. No. | Inventor(s) |
| --- | --- |
| 1,759,239 | Morrison |
| 2,929,248 | Sprenkle |
| 3,733,898 | Yamamoto et al. |
| 3,840,051 | Akashi et al. |
| 4,280,360 | Kobayashi et al. |
| 5,014,552 | Kamiunten et al. |
| 5,182,900 | Horak et al. |

However, as far as the applicants are aware, no one has found a way of measuring the shaping air velocity of a rotary bell atomizer in order to overcome the deficiencies described above.

SUMMARY OF THE INVENTION

One aspect of the invention is useful in a system for spraying paint, including a source of paint shaping air having an orifice or group of orifices through which the shaping air is expelled. The system also includes a bell for at least partially defining the shape of the shaping air. The applicants have discovered that the velocity of the shaping air can be accurately measured by providing means for collecting substantially all the shaping air expelled through the orifice or orifices. The collected shaping air is then straightened, and the velocity of the straightened shaping air is measured. As a result of this technique, the average velocity of the shaping air may be calibrated from a single velocity sample.

The technique also can be used in connection with a rotary bell atomizer in which the shaping air is provided not only by an air supply, but also by air exhausted from a turbine that drives a bell cup. As a result, the shaping air velocity of most common forms of rotary bell atomizers for spray painters can be accurately measured with a single instrument.

In the past, lack of knowledge about the effect that shaping air pressure settings have on symmetrically opposed bells has made the job of balancing and setting up overlapping patterns of multiple bells difficult. Diagnostics about the causes of differences in paint film buildup from one side of a painted body to the other is also made difficult. By using the techniques described in this specification, the air pressure settings and turbine velocities of symmetrically opposed bells can be adjusted to precisely balance the shaping air velocity of the bells with a degree of accuracy and reliability previously unobtainable.

BRIEF DESCRIPTION OF DRAWINGS

The detailed description of certain preferred embodiments of the invention is provided below with reference to the accompanying drawings, wherein the same reference numeral is used for a given feature in all figures.

FIG. 1A is a schematic, side elevational view of a prior paint sprayer using a rotary bell atomizer.

FIG. 1B is a schematic, side elevational view of the sprayer shown in FIG. 1A that has been fitted with a known device which attempts to measure the shaping air velocity of painter 10.

FIG. 3 illustrates a modified form of adaptor ring and collecting funnel for use in coupling the air velocity measuring apparatus shown in FIG. 2 to a paint sprayer of the type shown in FIG. 1A.

FIG. 4 is a diagrammatic, side elevational, exploded view of a micro-micro bell rotary bell atomizer of the type manufactured by Ransburg Corporation.

FIG. 5 is a diagrammatic, side elevational, exploded view of the apparatus shown in FIG. 4 in combination with the air velocity measuring apparatus shown in FIG. 2.

DETAILED DESCRIPTION OF CERTAIN PREFERRED EMBODIMENTS

Figure 2:
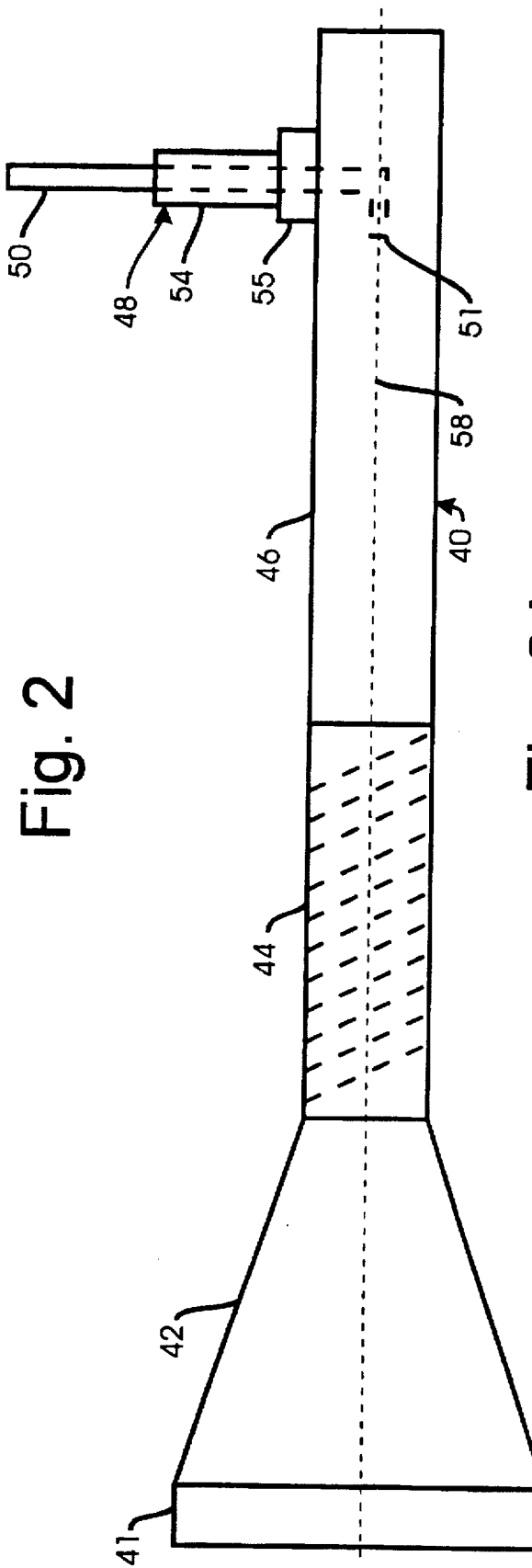
FIG. 2 is a side elevational view of a preferred form of air velocity measuring apparatus made in accordance with a preferred embodiment of the invention.
Figure 2A:
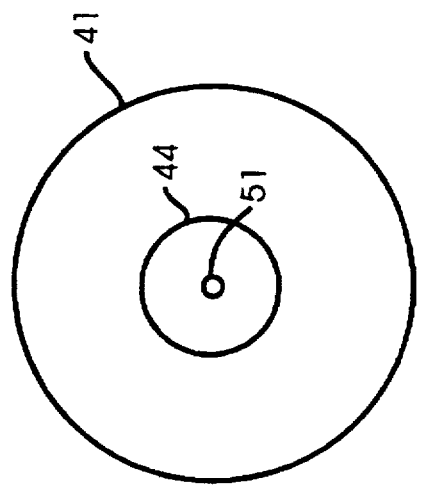
FIG. 2A is a front elevational view of the apparatus shown in FIG. 2.

Referring to FIG. 2, a preferred form of air velocity measuring tool 40 made in accordance with the preferred form of the present invention basically comprises a cylindrical adaptor ring 41 that permits the tool to fit snugly against a paint atomizer with a minimum amount of air leakage. The adaptor ring may be made from a compressible material, or may include a gasket that fits against the atomizer. Ring 41 preferably has an inside diameter of 2¾ inches.

Tool 40 also includes a conical collecting funnel 42 that increases the velocity of the air collected by collar 41 and channels the air into an airflow straightening section 44. Section 44 preferably has a length of 3½ inches.

Section 44 preferably comprises a 304 stainless steel honeycomb material, such as Model KYM162 having 0.062 inch wide hexagonal holes and 0.003 inch thick walls. Such a model is made by Kentucky Metals INCO, New Albany, Ind. 47150.

Section 44 also can be fabricated from a cylindrical section of a CELCOR brand oval monolithic automotive catalyst Model 083 834582 9475 1000EM, size 3.54×7.28× 6.00 inches, with 400 cells per square inch and 6.0 mil thick walls.

After the air has been straightened in section 44, it is conducted through an open section 46 of tube 40 that transmits the straightened air into a measurement section. Section 46 preferably has a length of 6½ inches. Sections 44 and 46 preferably have an inside diameter of 1 inch.

Tool 40 also includes a air velocity measuring device. A pressure sensing device, such as a Kiel probe 48 having an inlet tube 50 that defines an opening 51, may be successfully used. The Kiel tube is mounted by mounting collars 54 and 55 on the wall of tube 46 as shown.

Adaptor ring 41, collecting funnel 42, straightening section 44, tube 46 and opening 51, each have a longitudinal axis located on a common axis 58.

In addition to Kiel probe 48, other types of Pitot meters can be employed. Other types of anemometers also can be used to measure the air velocity in tube 46, such as turbine flow meters and thermal anemometers.

FIG. 3 illustrates a preferred method of connecting tool 40 to a paint sprayer 10 of the type shown in FIG. 1. For this purpose, tool 40 is fitted with a modified adaptor ring 41A and a modified collecting funnel 42A that channels substantially all of the shaping air produced by painter 10 into air straightener section 44 and tube 46 for measurement by Kiel probe 48.

The preferred embodiment also can be used to advantage in connection with a micro-micro bell paint sprayer having a rotary bell atomizer of the type manufactured by Ransburg Corporation. As shown in FIG. 4, a micro-micro bell sprayer 60 comprises a housing 61 defining a stop flange 62 and a threaded collar 63. The sprayer includes an air turbine 64 that rotates a threaded shaft 66. A bell cup 68 bears a threaded collar 70 that is threaded onto shaft 66.

Sprayer 60 also includes an inner collar 72 that slips over cup 68 and an outer collar 76 that screws onto housing collar 63 so that rear edge 77 abuts stop flange 62. Outer collar 76 holds inner collar 72 in place when the parts are properly assembled. Outer collar 76 also includes a front edge 78. The space between edge 78 and bell cup 68 defines a generally circular opening that directs shaping air toward a surface to be painted.

Sprayer 60 also includes a pattern control ring 82 that is held onto the surface of outer collar 76 with set screws. Paint flows into sprayer 60 along a paint line 84. An air supply 88 supplies a portion of the shaping air that is conducted along lines generally indicated by air flow arrows 86.

Sprayer 60 is constructed so that the exhaust air from turbine 64 flows through the opening in outer collar 76 and contributes substantially to the supply of shaping air.

Referring to FIG. 5, both the shaping air supplied by air supply 88 and the air exhausted from turbine 64 flow through sprayer 60 and through tool 40 in the manner indicated by arrows 86. Thus, tool 40 can determine the velocity of the shaping air supplied by air supply 88 and turbine 64.

Figure 6:
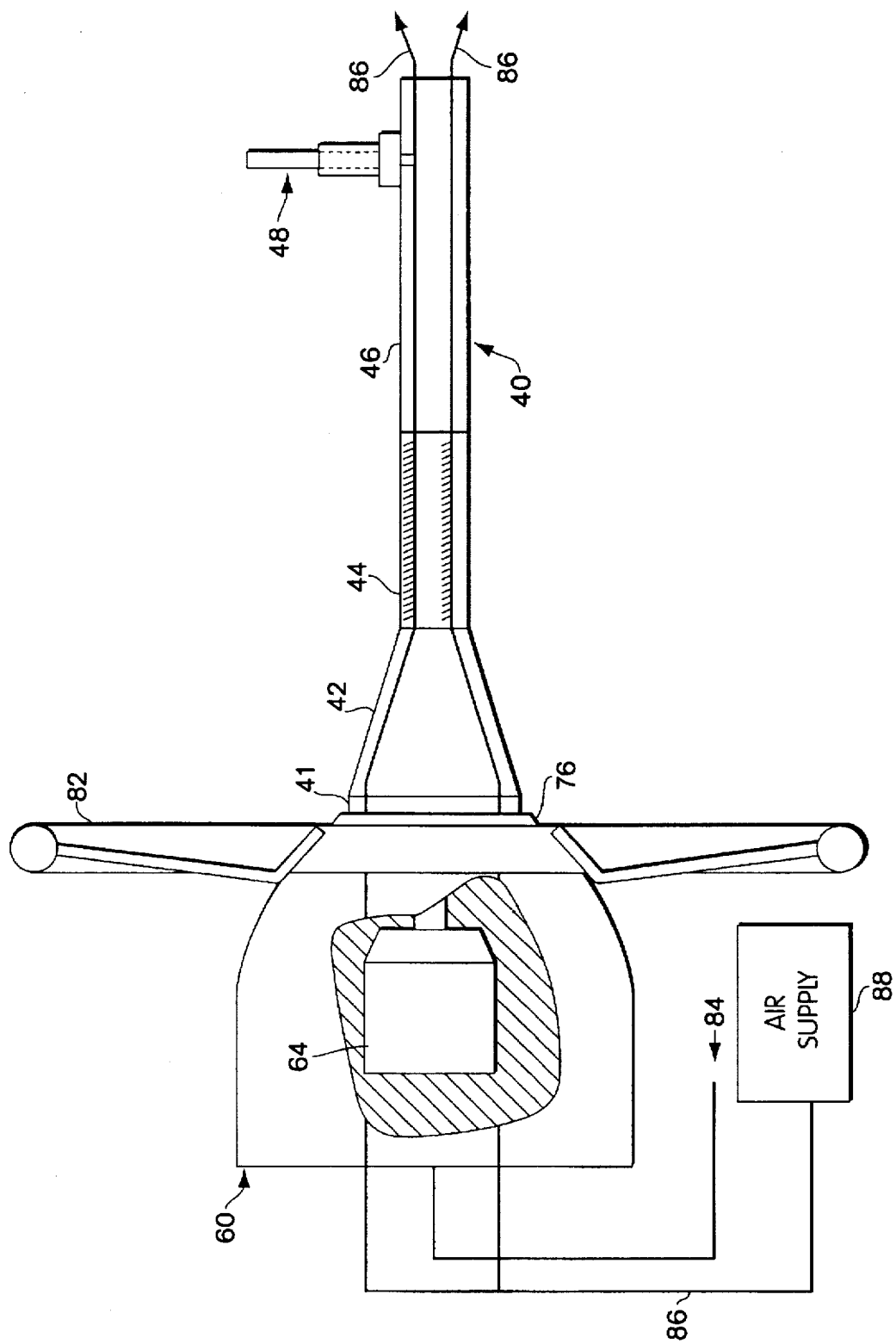
FIG. 6 is a diagrammatic, side elevational view of the atomizer shown in FIG. 4 as assembled and as fitted with the air velocity measuring device shown in FIG. 2 arranged to collect all of the shaping air expelled from the atomizer.

Referring to FIG. 6, tool 40 is shown positioned against sprayer 60 in order to determine the velocity of the shaping air. In order to determine the velocity, air supply 88 is turned on and turbine 64 is turned on so that the components of the shaping air supplied both by supply 88 and turbine 64 are present. The entire shaping air for sprayer 60 is then conducted through tool 40 in the manner described in connection with FIG. 2 and is shown by arrows 86.

Based on the sensing techniques described in connection with FIG. 6, the applicants have discovered that the shaping air velocity is dependent both on turbine speed and shaping air pressure from supply 88. Data obtained from tool 40 can be used in regression analysis in order to establish whether different bells have different shaping air velocity for the same settings. This information can be used to adjust the pressure settings and turbine velocities that give equal air shaping velocities for bells that are used cooperatively. Typically, the turbine velocity is varied from 30,000 to 50,000 revolutions per minute.

For example, in the case of symmetrically opposed bells used to paint the driver's side versus the passenger's side of a vehicle, the data from tool 40 can be used to establish pressure settings that give equal velocities on both sides of the car. One bell might need 13 lbs. per square inch of shaping air in order to have the same shaping velocity as another bell set at 15 lbs. per square inch. By using the velocity measuring techniques described above, paint can be applied to both sides of car with a degree of uniformity and reliability previously unobtainable.

The various preferred versions or embodiments of the invention described in detail above are intended only to be illustrative of the invention. Those skilled in the art will recognize that modifications, additions and substitutions can be made in the various features and elements of the invention without departing from the true scope and spirit of the invention. The following claims are intended to cover the true scope and spirit of the invention.

What we claim is:

1. In a system for spraying paint including a source of paint shaping air defining an orifice through which said shaping air is expelled, and a bell for at least partially defining the shape of said shaping air, improved apparatus for measuring the velocity of said shaping air comprising in combination:

means for collecting substantially all of said shaping air expelled through said orifice;

means for straightening said collected shaping air; and means for measuring the velocity of said straightened shaping air, whereby the average velocity of said shaping air may be calibrated from a single velocity sample.

2. Apparatus, as claimed in claim 1, wherein said source of paint shaping air comprises an air supply which expels air through said orifice and a turbine for driving said bell, the exhaust air from said turbine being transmitted through said orifice, whereby said paint shaping air comprises the combination of said exhaust air from said turbine and air from said air supply.

3. Apparatus, as claimed in claim 2, wherein said means for collecting comprises a collar fitted adjacent said orifice and a funnel coupled to said collar.

4. Apparatus, as claimed in claim 2, wherein said means for straightening comprises a core of a catalytic converter.

5. Apparatus, as claimed in claim 2, wherein said means for straightening comprises stainless steel honeycomb material.

6. Apparatus, as claimed in claim 2, wherein said means for measuring comprises a pressure sensor having an inlet.

7. Apparatus, as claimed in claim 6, wherein said pressure sensor comprises a Kiel tube.

8. Apparatus, as claimed in claim 6, and further comprising an extension tube connected between said means for straightening and said inlet for said pressure sensor.

9. Apparatus, as claimed in claim 8, wherein said means for collecting, means for straightening and said inlet are located on a common axis.

10. In a system for spraying paint including a source of paint shaping air defining an orifice through which said shaping air is expelled, and a bell for at least partially defining the shape of said shaping air, an improved method for measuring the velocity of said shaping air comprising the steps of:

collecting substantially all of said shaping air expelled through said orifice;

straightening said collected shaping air; and measuring the velocity of said straightened shaping air, whereby the average velocity of said shaping air may be calibrated from a single velocity sample.

11. A method, as claimed in claim 10, wherein said source of paint shaping air comprises an air supply which expels air through said orifice and a turbine for driving said bell, the exhaust air from said turbine being transmitted through said orifice, whereby said paint shaping air comprises the combination of said exhaust air from said turbine and air from said air supply and where said step of collecting substantially all of said shaping air expelled through said orifice comprises the step of rotating said turbine to provide a portion of said shaping air.

12. A method, as claimed in claim 11, wherein said step of collecting comprises the step of increasing the velocity of air expelled through said orifice.

13. A method, as claimed in claim 11, wherein said step of straightening comprises the step of dividing said collected shaping air into a plurality of channels.

14. A method, as claimed in claim 11, wherein said step of measuring the velocity of said straightened shaping air comprises the step of measuring the pressure difference between the pressure of said straightened shaping air and the ambient pressure and converting said pressure difference to velocity.

* * * * *